United States Patent
Okubo (10) Patent No.: US 10,325,624 B1
(45) Date of Patent: Jun. 18, 2019

(54) DISK DEVICE, PREAMPLIFIER, AND CONTROL METHOD

(71) Applicants: Kabushiki Kaisha Toshiba, Minato-ku, Tokyo (JP); Toshiba Electronic Devices & Storage Corporation, Minato-ku, Tokyo (JP)

(72) Inventor: Tomokazu Okubo, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/124,629

(22) Filed: Sep. 7, 2018

(30) Foreign Application Priority Data

Mar. 16, 2018  (JP) .................................. 2018-050003

(51) Int. Cl.
  *G11B 20/10* (2006.01)
  *G11B 5/09* (2006.01)
(52) U.S. Cl.
  CPC .......... *G11B 20/10481* (2013.01); *G11B 5/09* (2013.01)

(58) Field of Classification Search
  CPC ..... G11B 5/00; G11B 20/10009; G11B 27/36; G11B 20/10046; G11B 20/10027
  See application file for complete search history.

(56) References Cited

U.S. PATENT DOCUMENTS

| | | | |
|---|---|---|---|
| 7,697,225 B2 | 4/2010 | Takahashi | |
| 7,933,090 B1 | 4/2011 | Jung et al. | |
| 8,000,046 B2 * | 8/2011 | Yamazaki | G11B 5/09 360/294 |
| 2010/0134911 A1 | 6/2010 | Jin et al. | |

* cited by examiner

*Primary Examiner* — Nabil Z Hindi
(74) *Attorney, Agent, or Firm* — White & Case LLP (57) ABSTRACT

According to one embodiment, there is provided a disk device including a head and a controller. The controller, with mapping information in which parameter sets each including multiple types of parameters related to operations of the head are mapped to an adjustment variable so as to be associated with multiple different values of the adjustment variable, evaluates operations of the head while changing the value of the adjustment variable contained in the mapping information and determines a parameter set corresponding to an appropriate value of the adjustment variable based on the evaluation results and the mapping information to set for operations of the head using the determined parameter set.

20 Claims, 11 Drawing Sheets

DISK DEVICE, PREAMPLIFIER, AND CONTROL METHOD

CROSS-REFERENCE TO RELATED APPLICATIONS

This application is based upon and claims the benefit of priority from Japanese Patent Application No. 2018-050003, filed on Mar. 16, 2018; the entire contents of which are incorporated herein by reference.

FIELD

Embodiments described herein relate generally to a disk device, a preamplifier, and a control method.

BACKGROUND

In disk devices, a head writes and reads data onto and from a disk medium. In this case, it is desired to control the operation of the head appropriately.

DETAILED DESCRIPTION

In general, according to one embodiment, there is provided a disk device including a head and a controller. The controller, with mapping information in which parameter sets each including multiple types of parameters related to operations of the head are mapped to an adjustment variable so as to be associated with multiple different values of the adjustment variable, evaluates operations of the head while changing the value of the adjustment variable contained in the mapping information and determines a parameter set corresponding to an appropriate value of the adjustment variable based on the evaluation results and the mapping information to set for operations of the head using the determined parameter set.

Exemplary embodiments of a disk device will be explained below in detail with reference to the accompanying drawings. The present invention is not limited to the following embodiments.

Embodiment

Figure 1:
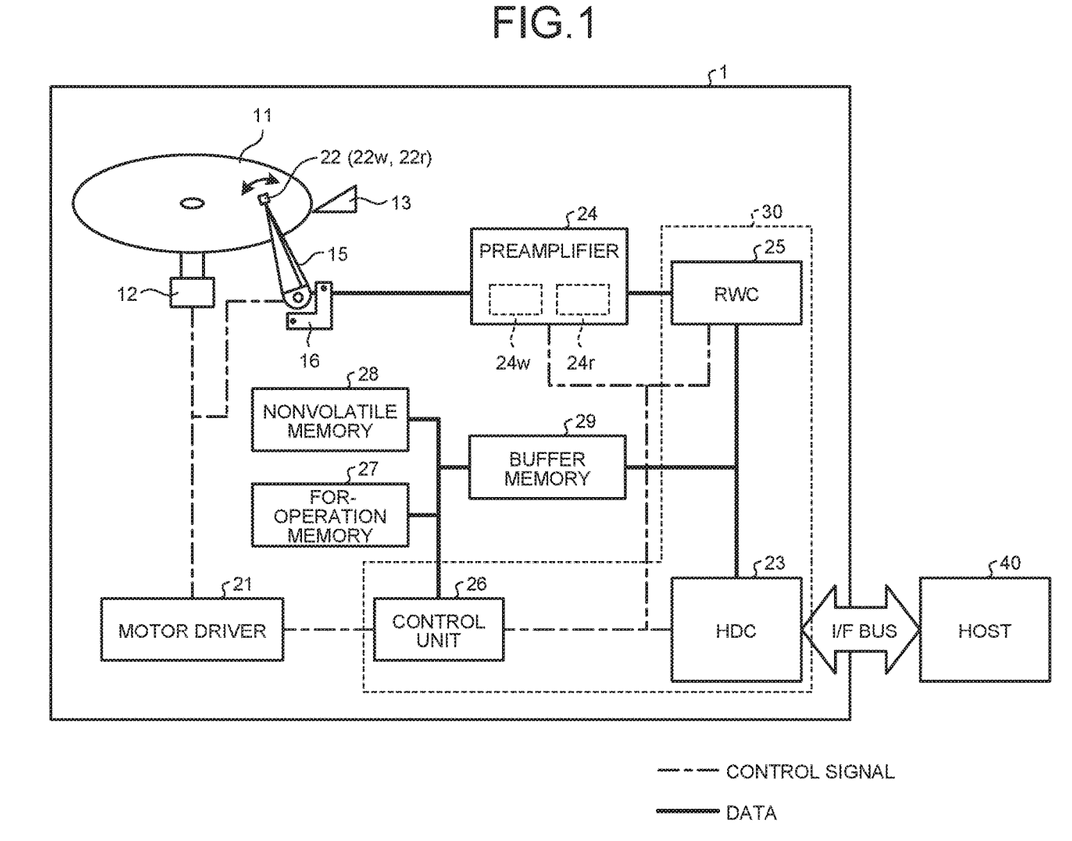
FIG. 1 is a diagram illustrating the configuration of a disk device according to an embodiment.

A disk device according to an embodiment is configured such that a head writes and reads data onto and from a disk medium. For example, the disk device 1 is configured as shown in FIG. 1. FIG. 1 is a diagram illustrating the configuration of the disk device 1.

The disk device 1 includes a disk medium 11 and records information onto the disk medium 11 according to a request from a host 40. The disk device 1 is, for example, a magnetic disk device, a magneto optical disk device, or the like. Although the case where the disk device 1 is a magnetic disk device will be illustrated below, the present embodiment can be applied to other devices as well.

The disk device 1 records information onto the disk medium 11 via, e.g., a head 22 and reads a signal from the disk medium 11 via the head 22. Specifically, the disk device 1 comprises the disk medium 11, a spindle motor 12, a motor driver 21, the head 22, an actuator arm 15, a voice coil motor (VCM) 16, a ramp 13, a preamplifier 24, a read write channel (RWC) 25, a hard disk controller (HDC) 23, a buffer memory 29, and a control unit 26.

The disk medium 11 is rotated about a rotation axis as the center at a predetermined rotation speed by the spindle motor 12. The rotation of the spindle motor 12 is driven by the motor driver 21. The disk medium 11 may be, for example, a magnetic disk, a magneto optical disk, or the like. The disk medium 11 is, for example, a recording medium having a perpendicular magnetic recording layer. For example, a plurality of servo areas extending in radial directions from near the center of the disk medium 11 are defined on the front and back surfaces of the disk medium 11. The servo areas may be placed at equal intervals along a circumferential direction. For example, servo information containing servo patterns is recorded on the servo areas. Further, the servo patterns define a plurality of tracks concentric with the innermost track near the center of the disk medium 11 on the front and back surfaces of the disk medium 11. Data areas on which to record user data are provided between the plurality of servo areas on each track. That is, a servo area and a data area are alternately, repeatedly placed in a circle on each track.

The head 22 writes and reads data onto and from the disk medium 11 by a write element 22w and a read element 22r provided therein. The head 22 is at the tip of the actuator arm 15 and moved by the VCM 16 driven by the motor driver 21 along a radial direction (track width direction) of the disk medium 11. When the rotation of the disk medium 11 is stopped or so on, the head 22 is evacuated on the ramp 13.

The preamplifier 24 has a write register 24w and a read register 24r. The write register 24w stores a parameter set including multiple types of setting parameters related to write operations of the head 22. By this means, setting is made for read operations of the head 22 (read element 22r). The read register 24r stores a parameter set including multiple types of setting parameters related to read operations of the head 22. By this means, setting is made for write operations of the head 22 (write element 22w).

In read operations, the preamplifier 24 amplifies a signal read by the head 22 from the disk medium 11 according to the parameter set stored in the read register 24r to output and supplies to the RWC 25. Further, the preamplifier 24 amplifies a signal supplied from the RWC 25 to write data onto the disk medium 11 according to the parameter set stored in the write register 24w and supplies to the head 22.

The HDC 23 controls data transmission to and reception from a host computer 40 via an I/F bus, controls the buffer memory 29, performs data-error correction processing on record data, and so on. The buffer memory 29 is used as a cache for data transmitted to and received from the host computer 40. The buffer memory 29 is used for the purpose of temporarily storing data read from the disk medium 11, data to be written onto the disk medium 11, or for-control firmware read from the disk medium 11, and so on.

The RWC 25 code modulates data supplied from the HDC 23 to be written onto the disk medium 11 and supplies to the preamplifier 24. Further, the RWC 25 code demodulates the signal read from the disk medium 11 and supplied from the preamplifier 24 and outputs as digital data to the HDC 23.

A for-operation memory 27 (e.g., an SRAM: Static random access memory), a nonvolatile memory 28 (e.g., a Flash ROM: Flash read only memory), and a for-temporary-storage buffer memory 29 (e.g., an SDRAM: Syncronous dynamic random access memory) are connected to the control unit 26. The control unit 26 controls the disk device 1 overall according to firmware (program data) stored beforehand in the nonvolatile memory 28 and on the disk medium 11. The control unit 26 is, for example, a CPU. The firmware includes initial firmware and for-control firmware used for normal operation. The initial firmware executed first at the time of startup is stored in, e.g., the nonvolatile memory 28. The for-control firmware may contain part of the function of a controller 30 (see FIG. 5) as described later. The for-control firmware used in normal operation is recorded on the disk medium 11 and, by control according to the initial firmware, is read from the disk medium 11 temporarily into the buffer memory 29 and then stored into the for-operation memory 27.

Note that the configuration including the RWC 25, the control unit 26, and the HDC 23 can be regarded as the controller 30.

The disk device 1 controls the write and read operations of the head 22 according to the parameter sets including multiple types of setting parameters related to the operations of the head 22. In order to control the operations of the head 22 appropriately, the disk device 1 performs adjustment processing to select an appropriate candidate from among multiple candidates for the parameter sets used in the write and read operations of the head 22. In this test process, various parameter sets are selected to maximize record quality (e.g., the bit error rate) and device capacity.

However, because of function addition in the disk device 1, the types of setting parameters related to the operations of the head 22 are increasing in number, so that the degree of difficulty in reduction in the adjustment time is increasing.

Figure 2:
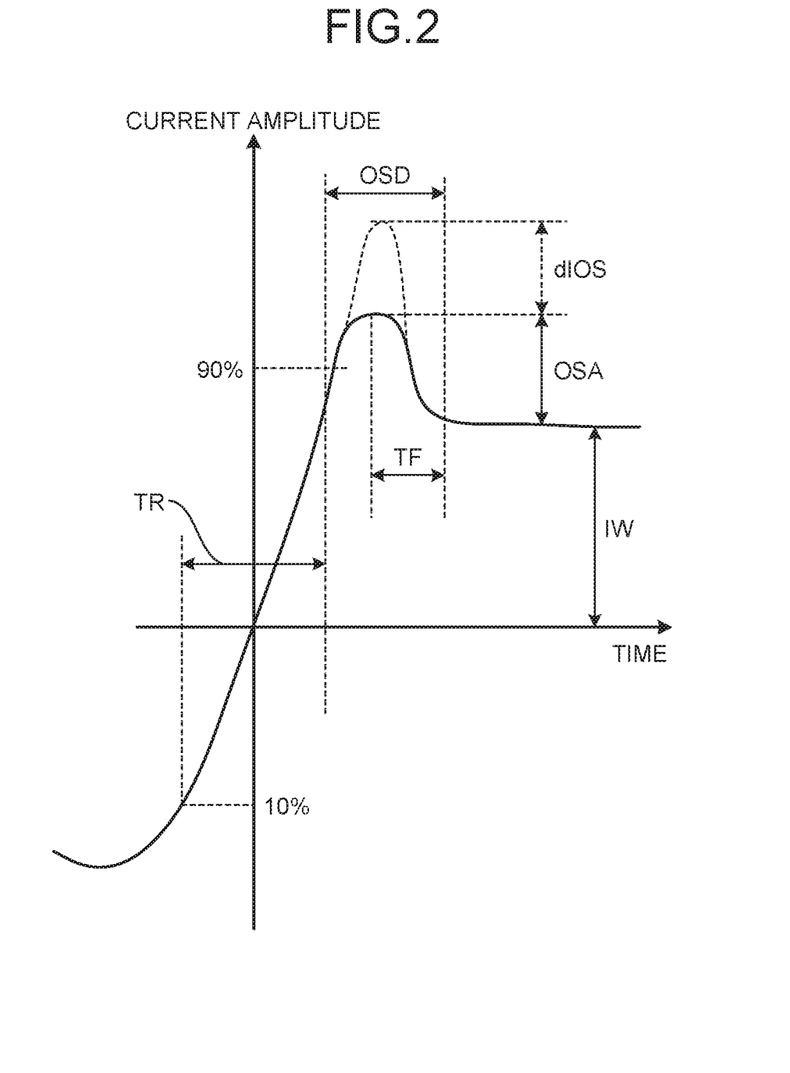
FIG. 2 is a chart illustrating multiple types of setting parameters included in a parameter set in the embodiment.

For example, a write current, which is made to flow through the head 22 when writing, being smaller is better from the viewpoint of lower power consumption, and making its waveform overshoot so as to efficiently write onto the disk medium 11 with a smaller level of current is known to be effective. Hence, the write current is controlled to take on a waveform having an overshoot as shown in FIG. 2. FIG. 2 is a chart illustrating multiple types of setting parameters included in a parameter set. In FIG. 2, the vertical axis represents the current amplitude, and the horizontal axis represents time.

The parameter set related to the write current may include setting parameters (multiple types of setting parameters) such as a DC amplitude (IW), an overshoot amplitude (OSA), an overshoot width (OSD), a rise time (TR), a fall time (TF), and a pattern modulation write current amplitude (dIOS). The DC amplitude IW indicates the magnitude of the current amplitude in a stable state after the waveform overshoots. The overshoot amplitude OSA indicates by what degree of current amplitude the waveform overshoots above the DC amplitude IW. The overshoot width OSD indicates for what degree of time width the waveform overshoots above the DC amplitude IW. The rise time TR indicates the time required for a change from 10% to 90% of the total amount of change between before and after the change immediately before the waveform overshoots. The fall time TF indicates the time from the peak timing of the waveform overshooting until the overshoot ends with the waveform going into the stable state. The pattern modulation write current amplitude dIOS indicates an additional current amplitude when the waveform is made to overshoot additionally to a normal overshoot as indicated by a broken line above the current waveform of a particular data pattern.

If the disk device 1 evaluates the operations of the head 22 by trial and error for a vast number of combinations for the purpose of adjustment for an appropriate combination of these multiple types of setting parameters, then it is difficult to reduce the processing time.

One can think of reducing the number of setting parameters to adjust in order to reduce the adjustment processing time, but in this case, the adjustment is likely to be insufficient, and it tends to be difficult to make record quality (e.g., the bit error rate) fall within a permissible range. With further addition of new setting parameters in the future being envisaged, this tendency may become increasingly remarkable. That is, an efficient adjustment algorithm to enable making record quality appropriate in a shorter time is required.

Accordingly, in the present embodiment, in the disk device 1, mapping information in which parameter sets are associated with values of an adjustment variable is prepared; the value of the adjustment variable is made appropriate; and a parameter set corresponding to the value made appropriate is obtained from the mapping information to set for operations of the head, thereby reducing the adjustment processing time.

Specifically, the adjustment is made using a one-dimensional adjustment variable defined in the mapping information to correspond one-to-one to a parameter set including multidimensional setting parameters. For example, adjustments of multiple types of (or multidimensional) write current parameters are simulatively converted to an adjustment of one (or one-dimensional) current characteristic value. By this means, the adjustment time can be greatly reduced.

More specifically, setting parameters are converted from multidimensional to one-dimensional as follows. For example, the method of changing write current parameters so as to be one-dimensional will be described. A current characteristic value IWS is used as the adjustment variable and defined by the following equation 1.

$$IWS = \mathrm{Min}_n [\int_0^{Tb} dt\, WC_n(t, IAD)] \quad \text{Eq. 1}$$

Figure 3:
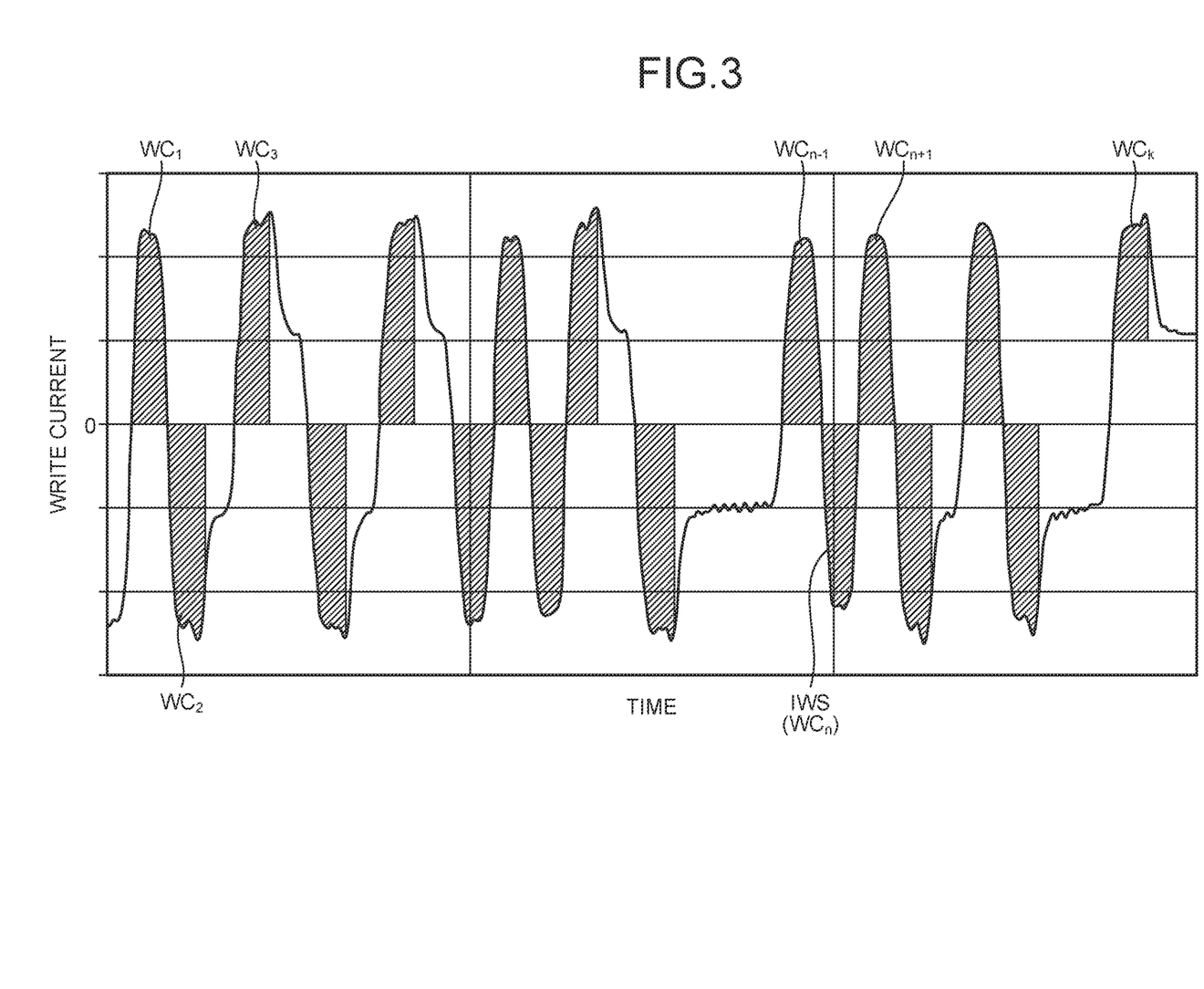
FIG. 3 is a chart illustrating an adjustment variable used in adjustment processing in the embodiment.

In equation 1, $WC_n(t, IAD)$ is the waveform of the write current at an n-bit inversion position under one write current condition IAD=(IW, OSA, . . . ). Tb denotes the upper limit of the current waveform integral time with respect to a current polarity inversion position and is a parameter corresponding to responsivity intrinsic to the magnetic head. The IWS defined by equation 1 together with the write current waveform is illustrated in FIG. 3. FIG. 3 is a chart illustrating an adjustment variable used in the adjustment processing with the IWS as the adjustment variable.

When the value of the write current is integrated over each period from a zero-cross timing at which the write current waveform intersects with the straight line of the write current=0 until the predetermined time Tb elapses, multiple integral values $WC_1$, $WC_2$, . . . , $WC_{n-1}$, $WC_n$, $WC_{n+1}$, . . . , $WC_k$ corresponding to multiple zero-cross timings are obtained. The smallest one (in the case of FIG. 3, integral value $WC_n$) of the multiple integral values $WC_1$ to $WC_k$, where n is an integer of two or greater and k is an integer greater than or equal to n and two, is defined as the adjustment variable IWS. The adjustment variable IWS denotes, in a physical sense, the smallest current output (magnetic field strength) in the random pattern.

Figure 4:
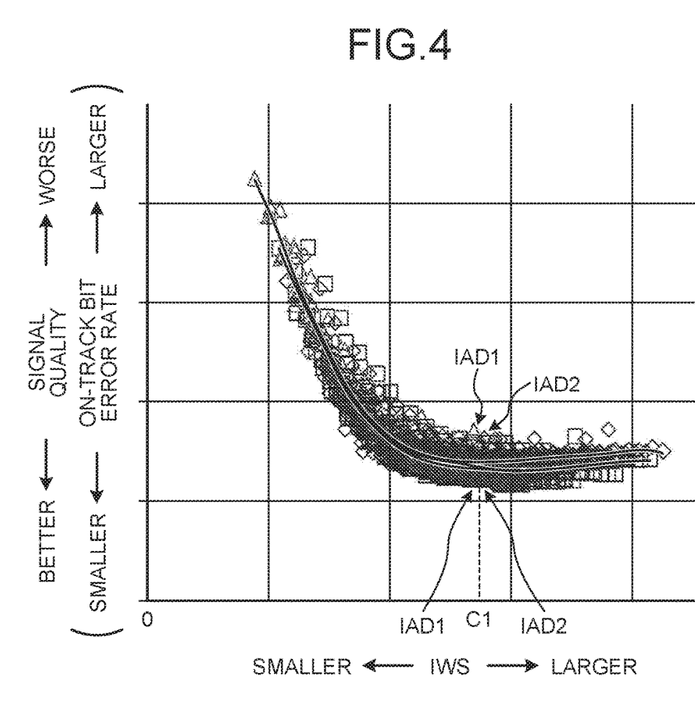
FIG. 4 is a graph illustrating the relation between the value of the adjustment variable and signal quality in the embodiment.

When signal quality is plotted against this adjustment variable IWS on a coordinate plane, as shown in FIG. 4, it can be confirmed that a good correlation is demonstrated. In FIG. 4, an on-track bit error rate is used as an index of the signal quality. The on-track bit error rate is a bit error rate which was evaluated while the head 22 was made to be on track for a predetermined track on the disk medium 11 without writing information onto the disk medium 11 or so on, in the disk device 1.

However, as can be guessed from the definition of the adjustment variable IWS expressed by equation 1 and confirmed by FIG. 4, a value of the adjustment variable IWS does not necessarily correspond one-to-one to a write-current-related parameter set IAD=(IW, OSA, . . . ). This is because the adjustment variable IWS denotes a characteristic at a local worst pattern in the current waveform, and there are multiple different parameter sets for which the values of the adjustment variable IWS are the same. For example, in the case of FIG. 4, two parameter sets IAD1, IAD2 correspond to a value C1 of the adjustment variable IWS.

Figure 5:
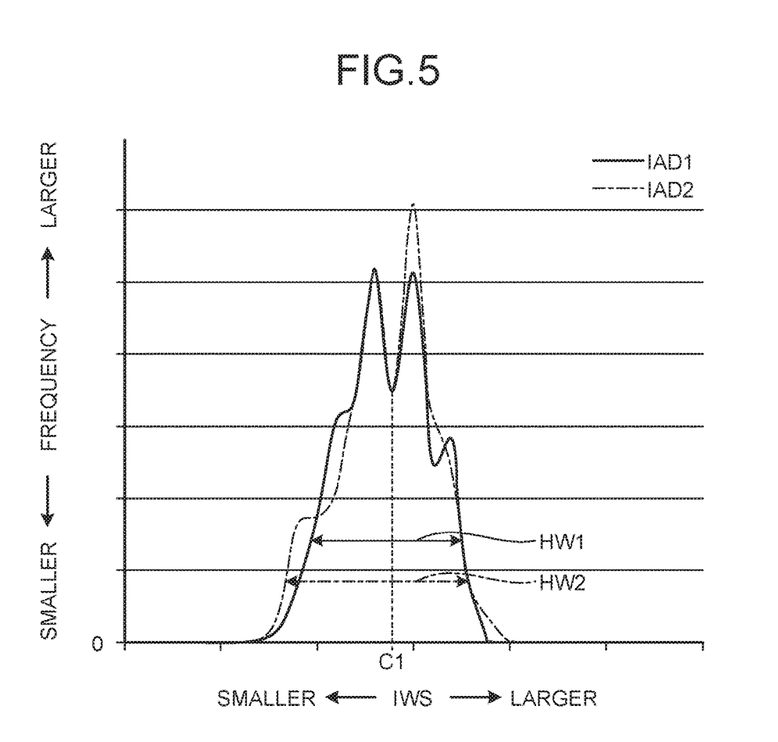
FIG. 5 is a graph illustrating the evaluation of variation in the value of the adjustment variable in the embodiment.

Accordingly, for multiple parameter sets IAD corresponding to the same value of the adjustment variable IWS (e.g., the two parameter sets IAD1, IAD2 correspond to the value C1 of the adjustment variable IWS), σIWS as shown in FIG. 5 is introduced as another parameter to denote the difference in record quality. FIG. 5 is a graph illustrating the evaluation of variation in the adjustment variable. The parameter σIWS denotes the degree of variation in the adjustment variable IWS and is defined by the following equation 2.

$$\sigma IWS = \text{Stdev}[\int_0^{Tb} dt\, WC_n(t, IAD)] \qquad \text{Eq. 2}$$

Here, Stdev[ ] is a standard deviation, and σIWS denotes variation in current output (magnetic field strength) per bit in the random pattern. It is known that an increase in variation in current output per bit worsens on-track record quality and a fringe characteristic, and in device evaluation, a tendency for the areal recording density to improve under the condition that σIWS is suppressed is confirmed. The σIWS is a global parameter characterized by the entire current waveform, and even if the IWS is the same, the σIWS can take on a different value as long as the current waveforms do not coincide in shape. Thus, by imposing the condition that the σIWS be smallest on a set of write current parameters for which the IWS is the same, an appropriate parameter set IADr=(IWr, OSAr, . . . ) corresponding to a particular IWS value can be uniquely decided on. In other words, a parameter set IAD including multiple setting parameters can be mapped one-to-one to the one-dimensional adjustment variable IWS.

In the case of FIG. 5, in the distribution of values of the adjustment variable IWS corresponding to the parameter set IAD1, the median value almost equals C1, and the variation width (e.g., 3σ section width) is σIWS=HW1. In the distribution of values of the adjustment variable IWS corresponding to the parameter set IAD2, the median value almost equals C1, and the variation width (e.g., 3σ section width) is σIWS=HW2. That is, since the median values of the distributions are the same, the parameter set are regarded as corresponding to the same value of the adjustment variable IWS. In FIG. 5, since HW1<HW2, it is seen that the parameter set IAD1 is smaller in variation than the parameter set IAD2. Thus, where the two parameter sets IAD1, IAD2 correspond to the value C1 of the adjustment variable IWS, the parameter set IAD1 whose variation width σIWS is smaller is associated with the value C1 of the adjustment variable IWS. That is, the parameter set IAD1 is mapped to the value C1 of the adjustment variable IWS.

The exact definition of one-dimensional parameter mapping is given by the following (1) to (5).

(1) Define a set {IAD} as including, as elements, parameter sets IAD=(IW, OSA, . . . ) that are write current conditions.
(2) Define mapping as IWS: {IAD}→R for the set {IAD}.
(3) Introduce an equivalence relation IWS(IADa)≈IWS(IADb) for the set {IAD} and obtain a quotient set "{IAD}/~" of {IAD}.
(4) Define a representative element (optimum current condition) as IADr=argmin[σIWS(IAD)] for the quotient set "{IAD}/~". Here, mapping is defined as σIWS: {IAD}/~→R.
(5) Thus, mapping IWS: {IADr}→{IWS(IADr)} becomes bijection. That is, the parameter set {IADr} of optimum write current parameters corresponds one-to-one to a value of the IWS.

Figure 6:
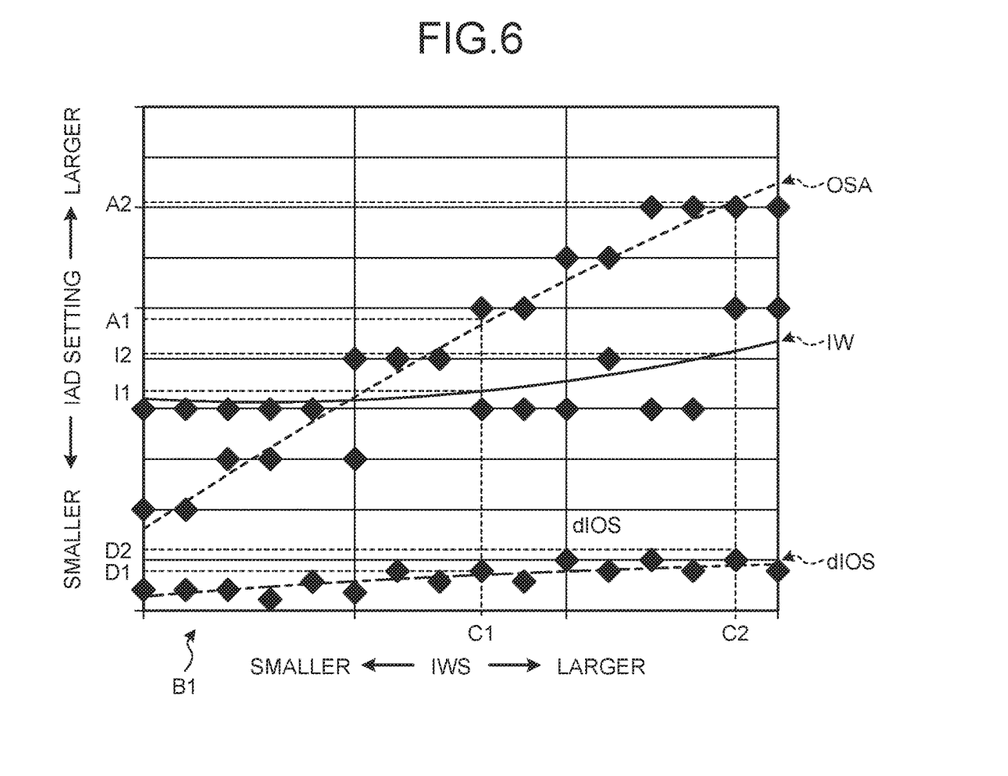
FIG. 6 is a graph illustrating the contents of mapping information in the embodiment.

Such mapping is performed for multiple values of the adjustment variable IWS, and the results are plotted on a coordinate plane and approximated by curves such as quadratic curves, resulting in the illustration in FIG. 6. FIG. 6 is a graph illustrating the contents of mapping information 31. Although FIG. 6 illustrates the results of mapping the DC amplitude IW, overshoot amplitude OSA, and pattern modulation write current amplitude dIOS from among multiple setting parameters included in the parameter set to the adjustment variable IWS, the other setting parameters (overshoot width OSD, rise time TR, fall time TF, and so on) can be mapped likewise.

Figure 7:
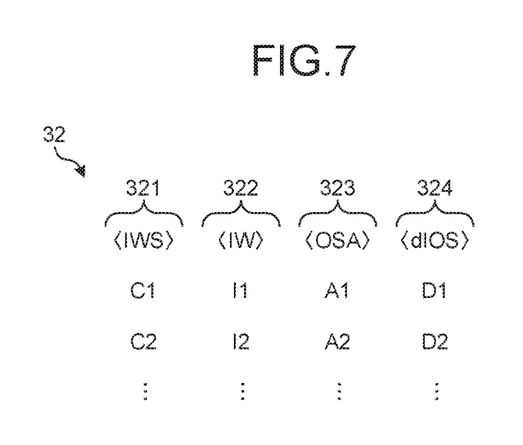
FIG. 7 is a diagram illustrating an example implementation (table) of the mapping information in the embodiment.

For example, the mapping information 31 shown in FIG. 6 may be implemented and managed, as it is, as table information 32 as shown in FIG. 7. The disk device 1 may create the table information 32 using values on the approximate curves corresponding to a value of the adjustment variable IWS in the mapping information 31 shown in FIG. 6 or may create the table information 32 using values plotted in the mapping information 31 shown in FIG. 6. The table information 32 shown in FIG. 7 can be stored into a management information storage area of the disk medium 11, for example, before shipment of the disk device 1.

The table information 32 contains an IWS column 321, an IW column 322, an OSA column 323, and an OSD column 324. In the IWS column 321, values C1, C2, and the like of the adjustment variable IWS are recorded. In the IW column 322, values I1, I2, and the like of the DC amplitude IW are recorded. In the OSA column 323, values A1, A2, and the like of the overshoot amplitude OSA are recorded. In the OSD column 324, values D1, D2, and the like of the pattern modulation write current amplitude dIOS are recorded. By referring to the table information 32, it is found out that the value I1 of the DC amplitude IW, the value A1 of the overshoot amplitude OSA, and the value D1 of the pattern modulation write current amplitude dIOS correspond to the value C1 of the adjustment variable IWS. Further, it is found out that the value I2 of the DC amplitude IW, the value A2 of the overshoot amplitude OSA, and the value D2 of the pattern modulation write current amplitude dIOS correspond to the value C2 of the adjustment variable IWS.

Or the mapping information may be approximated by function expressions concerning values of IW, OSA, corresponding to IWS to be implemented and used. For example, where the write current parameters included in the parameter set are the DC amplitude IW, overshoot amplitude OSA, overshoot width OSD, rise time TR, fall time TF, and pattern modulation write current amplitude dIOS, function expressions given by the following equations 3 to 8 can be implemented as the mapping information.

$$IW = f_{IW}(IWS) = \Sigma_n(\alpha_n * IWS^n) \quad \text{Eq. 3}$$

$$OSA = f_{OSA}(IWS) = \Sigma_n(\beta_n * IWS^n) \quad \text{Eq. 4}$$

$$OSD = f_{OSD}(IWS) = \Sigma_n(\gamma_n * IWS^n) \quad \text{Eq. 5}$$

$$TR = f_{TR}(IWS) = \Sigma_n(\delta_n * IWS^n) \quad \text{Eq. 6}$$

$$TF = f_{TF}(IWS) = \Sigma_n(\varepsilon_n * IWS^n) \quad \text{Eq. 7}$$

$$dIOS = f_{dIOS}(IWS) = \Sigma_n(\zeta_n * IWS^n) \quad \text{Eq. 8}$$

The function expressions given by the equations 3 to 8 can be stored into the management information storage area of the disk medium 11, for example, before shipment of the disk device 1.

Figure 8:
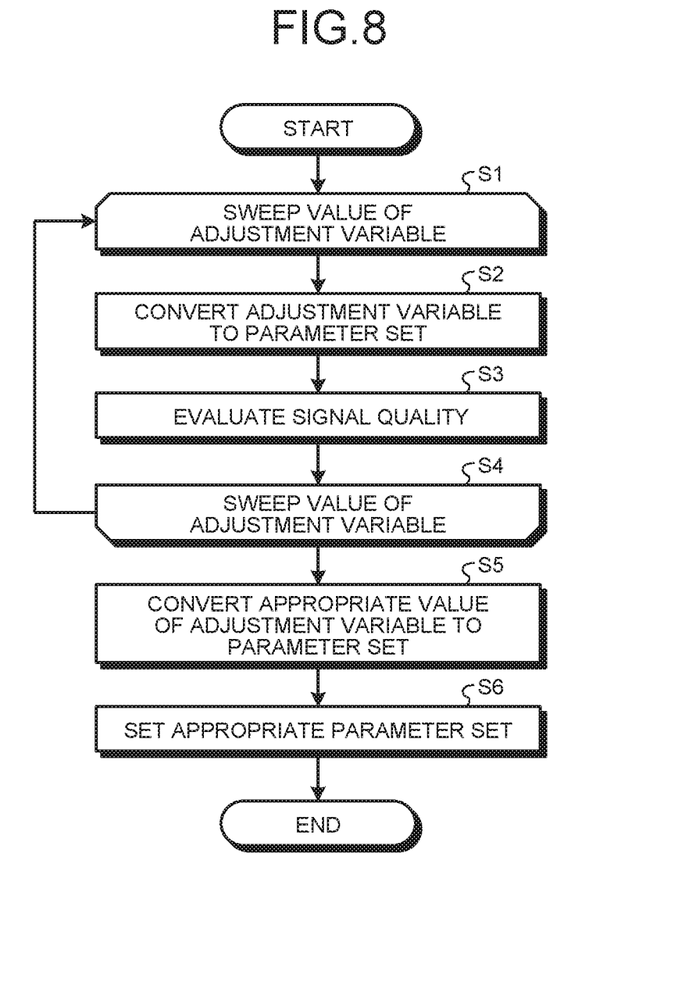
FIG. 8 is a flow chart illustrating the adjustment processing in the embodiment.

Next, the adjustment processing of the write current using the mapping information will be described using FIG. 8. FIG. 8 is a flow chart illustrating the adjustment processing. The adjustment processing shown in FIG. 8 may be performed in the production process of the disk device 1 or performed in a maintenance mode switched to after shipment of the disk device 1.

For example, with a method which repeats adjustment of a parameter set including multiple types of write current parameters sequentially multiple times while changing the write current parameters, as the number of types of write current parameters increases, the number of adjustment hours becomes vast. Accordingly, in reality, it cannot be helped to impose a restriction such as a reduction in the number of types of write current parameters to be adjusted or further limiting an adjustment range. Hence, an enough search for making record quality appropriate may not be carried out depending on selection of write current parameters to be adjusted or setting of an adjustment range, resulting in loss in the record quality. Further, the method which repeats adjustment sequentially multiple times while changing the parameters may be inefficient because, being based on setting values themselves for the write current parameters, there is a possibility that a lot of duplicate conditions from the viewpoint of actual current waveform characteristics are included.

Meanwhile, in the present embodiment, the controller 30 adjusts the write current through the medium of the current characteristic value IWS. For example, while sweeping the value of the adjustment variable IWS one-dimensionally (S1), the value of the adjustment variable IWS is converted to setting parameters in a corresponding parameter set using the mapping information (S2), and the converted-to setting parameters are stored into a register in the preamplifier 42 to set desired conditions for the write current, in which state the signal quality is evaluated (S3).

Figure 9:
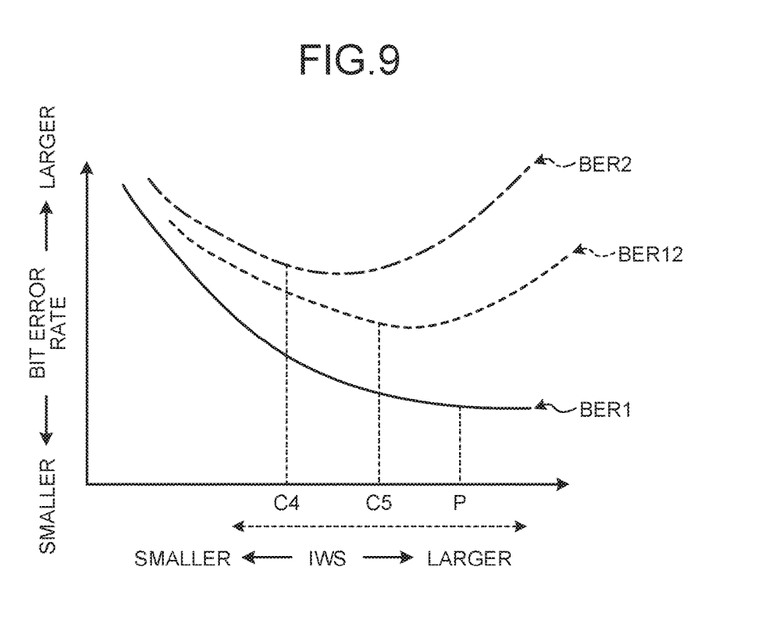
FIG. 9 is a graph illustrating the adjustment processing in the embodiment.

For example, as an index indicating the signal quality, an on-track bit error rate BER1 indicated by a solid line in FIG. 9 may be used, or a fringe bit error rate BER2 indicated by a dot-dashed line in FIG. 9 may be used, or an average bit error rate BER12 obtained by taking the average of the two, indicated by a broken line in FIG. 9, may be used. Which bit error rate to use can change depending on the management policy of the disk device 1. If the on-track bit error rate BER1 is used, C3 is obtained as an appropriate value of the adjustment variable IWS at which the signal quality is of a permissible level (e.g., minimal). If the fringe bit error rate BER2 is used, C4 is obtained as an appropriate value of the adjustment variable IWS at which the signal quality is of a permissible level (e.g., minimal). If the average bit error rate BER12 is used, C5 is obtained as an appropriate value of the adjustment variable IWS at which the signal quality is of a permissible level (e.g., minimal).

As indicated by a broken-line arrow in FIG. 9, the process of S1 to S3 is repeated until an appropriate value of the adjustment variable IWS at which the signal quality is of a permissible level is obtained, and when an appropriate value is obtained (S4), the appropriate value is converted to a parameter set using the mapping information (S5), and the converted-to parameter set is stored into a register in the preamplifier 42 so as to finish setting for write operations of the head 22 (S6).

At this time, only one parameter set IAD=(IW, OSA, . . . ) corresponds to one value of the IWS by the one-to-one mapping mentioned previously, so that the parameter set IAD corresponding to the appropriate value of the adjustment variable IWS can be set in the disk device 1. Because the one-to-one correspondence (mapping information) is formed such that a parameter set at which the signal quality is permissible (e.g., of an optimum level) is selected from among the parameter sets for which the adjustment variable IWS is the same in value, duplicate processing in characteristic by the method which repeats adjustment sequentially multiple times while changing individual setting parameters is almost eliminated.

Figure 10:
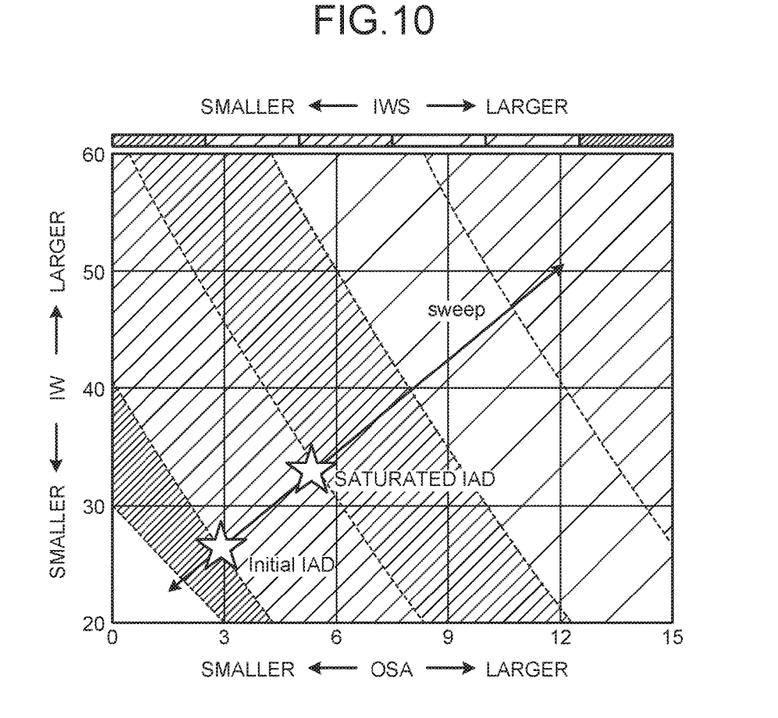
FIG. 10 is a graph illustrating the adjustment processing in the embodiment.

For example, in a parameter plane shown in FIG. 10 of the DC amplitude IW and the overshoot amplitude OSA, for the method of the present embodiment, a one-dimensional search suffices as indicated by a solid arrow in FIG. 10, whereas the method which repeats adjustment sequentially multiple times while changing individual setting parameters needs a two-dimensional search. FIG. 10 is a graph illustrating the adjustment processing.

Figure 11:
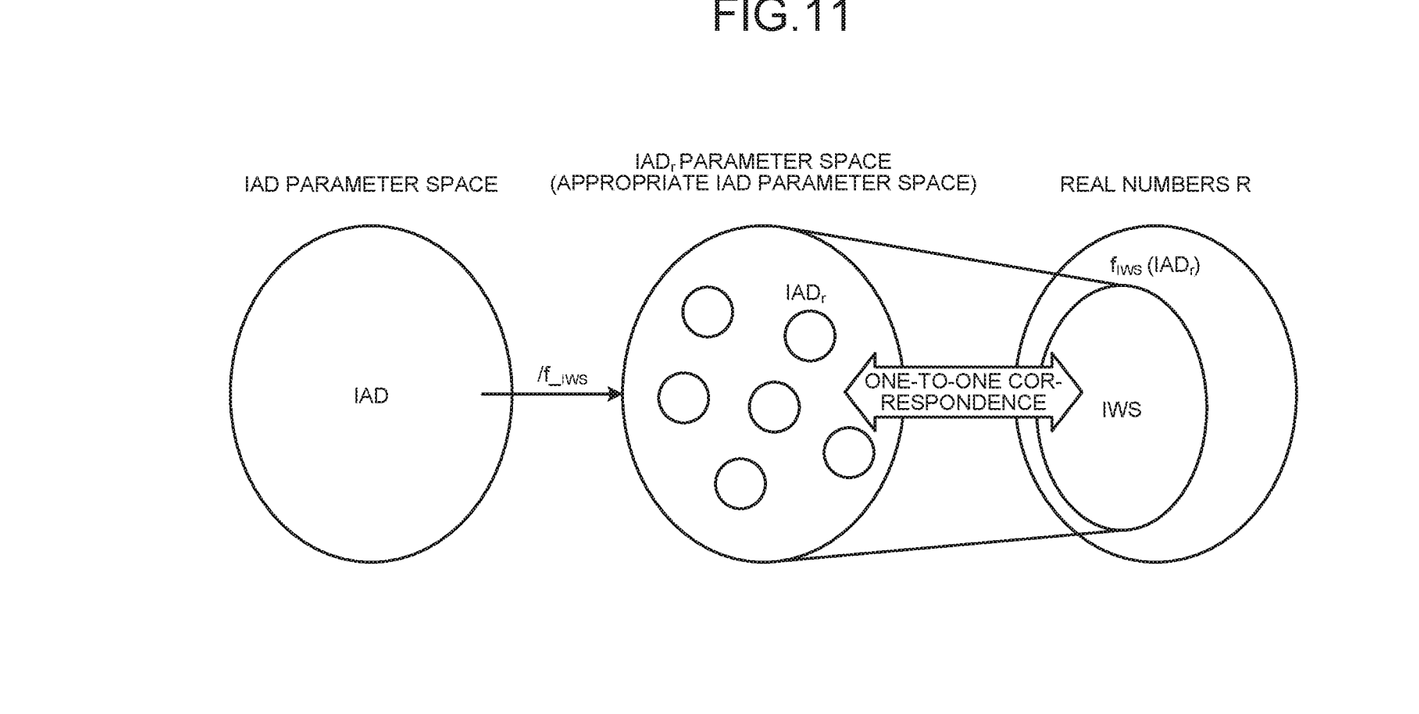
FIG. 11 is a diagram illustrating how to lower setting parameters in dimension in the embodiment.

This is mathematically represented by FIG. 11. FIG. 11 is a diagram illustrating how to lower setting parameters in dimension. That is, a parameter set appropriate (e.g., minimal) in variation is selected from the parameter space (multidimensional space having duplication) of parameter sets IAD to create a parameter space of the appropriate IAD (IADr), and mapping which associates the parameter space (multidimensional space having duplication eliminated) of the appropriate IAD one-to-one with a value of the adjustment variable IWS is carried out so as to lower, in dimension, into the space of real numbers R (a one-dimensional space) to which multiple values of the adjustment variable IWS belong.

Further, in the case of the present embodiment, if the number of write current parameters increases, the adjustment variable ostensibly remains the IWS (one-dimensional), so that it can be deal with without an increase in adjustment time. When adding to write current parameters, the mapping information needs to be re-formed beforehand in which each write current parameter is associated one-to-one with the adjustment variable IWS, but one-dimensional adjustment through the same adjustment variable IWS is fundamentally possible regardless of the contents of the write current parameters and the number of types of setting parameters, and thus it can be said that the method is high in expandability.

The mapping information in which a parameter set IAD is associated one-to-one with the adjustment variable (current characteristic value) IWS can be created from evaluation data obtained from actual measurement or a simulation of current waveforms of a device level. Write current waveforms of a random pattern in matrix conditions (if interpolation is performed, the conditions may be thinned out in number as needed) including all the write current parameters desired to be used in adjustment are measured, and IWS and σIWS for each write current waveform are obtained according to equations 1, 2. Conditions under which values of the current characteristic value IWS are the same or their differences are at or below a reference value, |IWS(IADa)−IWS(IADb)|<α, are categorized into a group, for each such occurrence, and an IAD condition whose σIWS is the smallest out of each group is associated as a representative value with a value of the IWS. By this means, a correspondence relation of only one parameter set IAD for each value of the adjustment variable IWS is obtained.

As such, in the embodiment, the disk device 1 prepares the mapping information in which parameter sets are associated with values of the adjustment variable and makes the value of the adjustment variable appropriate to obtain a parameter set corresponding to the value made appropriate from the mapping information so as to set for operations of the head 22. Thus, the time required for the adjustment processing can be easily reduced as compared with the case of adjusting multiple types of parameters individually.

Although in the embodiment description has been made illustrating write current parameters set in the preamplifier 24 for simplicity, write current parameters to be adjusted can be expanded to include all parameters affecting write current waveforms, not being limited to the write current parameters set in the preamplifier 24. Specifically, these can include WPC settings of the RWC 25 and the version number of a transmission line device. By adding these variables to parameters forming one-to-one mapping with the adjustment variable IWS, the present technique can be arbitrarily expanded.

Although the embodiment illustrates a sequence of the write current adjustment in the production process of the disk device 1 as an example, not being limited to this, the adjustment processing may be, for example, write current adjustment in a customer's environment or the like. Changes in the write current based on the adjustment variable IWS can also be used in temperature or zone interpolation. The management of write current parameter sets in the disk device 1 is performed through the adjustment variable IWS, and temperature/zone interpolation can also be performed on values of the adjustment variable IWS. In this case, in read and write operations, a parameter set IAD can be re-derived from the adjustment variable IWS managed as a drive parameter and the mapping information (IAD-IWS correspondence table) so as to be set in the preamplifier 24 and the RWC 25.

Although the embodiment illustrates the case where parameter sets related to the write current are subject to the adjustment processing, parameter sets related to read signal characteristics may be subject to the adjustment processing. It is understood that it is desirable that the frequency characteristic of the read signal be flat over a broad frequency range from a high band for the purpose of performing read operations by the head 22 appropriately. Hence, a parameter set related to read signal characteristics can include a gain G, a band FC, a high-frequency boost amount BST, and a cutoff frequency LFP as setting parameters. The band FC refers to the range used in information transmission out of the frequency range of the read signal. The high-frequency boost amount BST is a value indicating to what degree to enhance high-frequency-side components from among the frequency components remaining not cut off of the read signal. The cutoff frequency LFP is a frequency indicating the boundary of high-frequency components cut off when the preamplifier 24 performs low-pass filtering on the read signal.

For example, for read signal characteristics, a "high-frequency −3 dB band" can be taken as a first adjustment variable (corresponding to IWS in write current adjustment), and a "high-frequency −3 dB bandwidth" can be taken as a parameter denoting a second adjustment variable (corresponding to σIWS in write current adjustment). The "high-frequency −3 dB band" is a variable related to the usage band of the read signal and indicates, for example, the upper limit of the usage band of the read signal. The "high-frequency −3 dB bandwidth" is a variable related to variation in the usage band of the read signal and indicates, for example, variation in the upper limit of the usage band of the read signal. Multiple parameter sets corresponding to the same value of the first adjustment variable (high-frequency −3 dB band) are identified, and a parameter set for which the second adjustment variable (high-frequency −3 dB bandwidth) is appropriate (maximal) is determined from among the multiple parameter sets, and mapping information in which the determined parameter set is mapped to that value of the first adjustment variable (high-frequency −3 dB band) is created. Then an appropriate value (e.g., an optimum value) of the first adjustment variable (high-frequency −3 dB band) is searched for using the mapping information. The appropriate value can be a value at which the signal quality is of a permissible level (e.g., minimal of bit error rate) as in the case of the write current. When an appropriate value is found, the appropriate value is converted to a parameter set according to the mapping information, and the converted-to parameter set is stored into the read register 24r of the preamplifier 24. By this means, setting can be made for read operations of the head 22.

Figure 12:
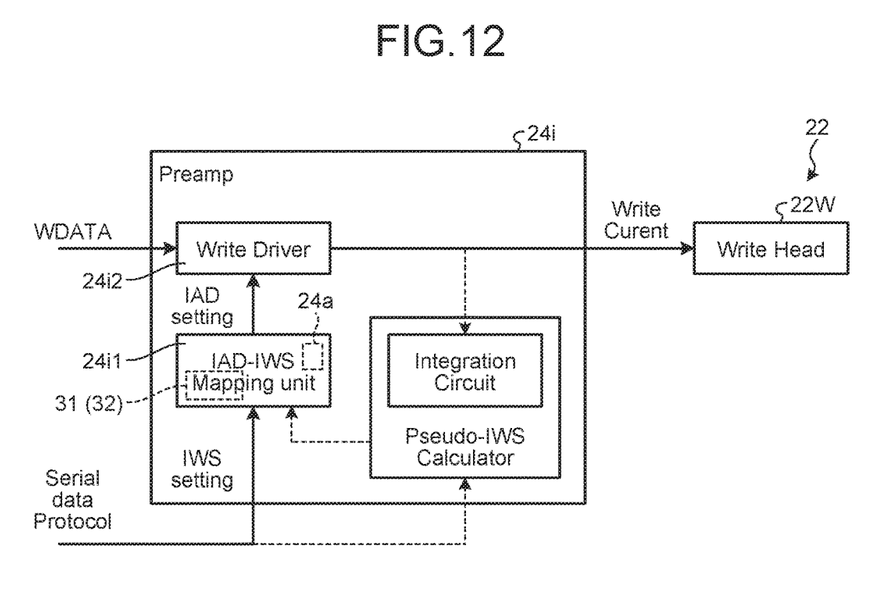
FIG. 12 is a diagram illustrating the configuration of a preamplifier in a modified example of the embodiment.

Although the embodiment illustrates the case where the adjustment processing is performed by the controller 30, the adjustment processing may be performed by a preamplifier. For example, as shown in FIG. 12, a setting function may be incorporated in the preamplifier 24i itself. FIG. 12 is a diagram illustrating the configuration of the preamplifier 24i in a modified example of the embodiment.

In this case, the preamplifier 24i includes a setting register corresponding to the adjustment variable IWS. The preamplifier 24i, having received an instruction to set (a serial data protocol), interprets as an inputted setting value of the adjustment variable IWS (an IWS setting) and obtains a parameter set IAD (an IAD setting) according to the relation between parameter sets IAD and the adjustment variable IWS (the mapping information 31 (e.g., the table information 32)) obtained beforehand by a mapping unit (IAD-IWS mapping unit) 24i1 to be held in a write register 24a. A write driver 24i2, having received write data WDATA, generates the write current according to the received write data WDATA and the parameter set IAD (the IAD setting) held in the mapping unit 24i1 to supply to the write element 22w of the head 22.

In this case, in management of parameter set IAD settings corresponding to setting values of the adjustment variable IWS, the parameter set IAD settings may be stored individually at different register addresses (addresses in the write register 24a) for respective values of the adjustment variable IWS, or, using an approximate expression of the parameter set IAD setting for the adjustment variable IWS, a coefficient of an interpolation formula of the adjustment variable IWS for each parameter set IAD may be held in a register.

Figure 13:
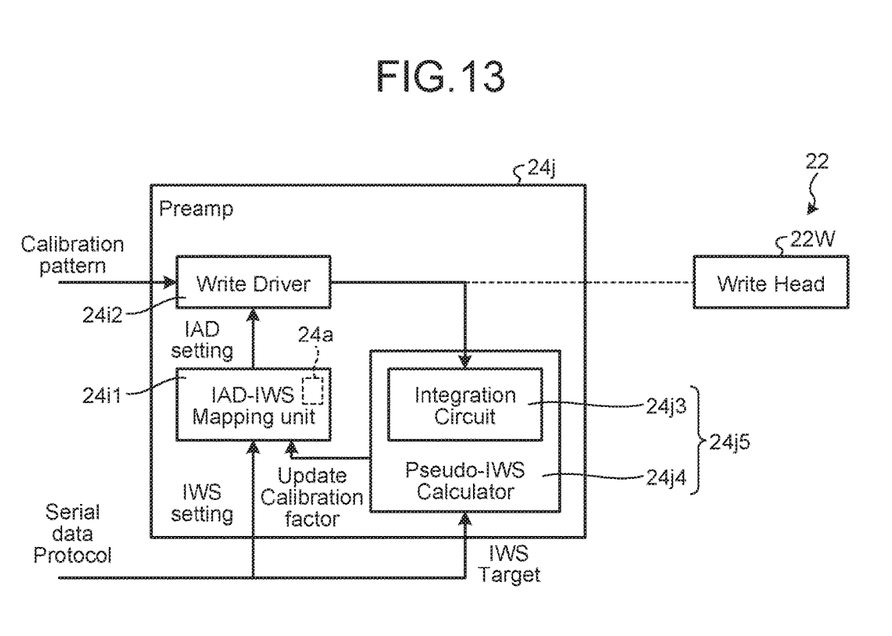
FIG. 13 is a diagram illustrating the configuration of a preamplifier in another modified example of the embodiment.

Or, as shown in FIG. 13, it is also possible to configure a preamplifier 24j to perform the derivation itself of the relation between parameter sets IAD and the adjustment variable IWS (the mapping information 31 (e.g., the table information 32)). FIG. 13 is a diagram illustrating the configuration of the preamplifier 24j in another modified example of the embodiment. FIG. 13 illustrates operation when a calibration operation is performed. In this case, an integration circuit 24j3 for monitoring the output of a write driver 24i2 and a computing unit (pseudo IWS calculator) 24j4 are incorporated in the preamplifier 24j. The configuration including the integration circuit 24j3 and computing unit 24j4 can be regarded as a calibration circuit 24j5 that operates in performing calibration.

Here, the configuration is made such that the computing result of an adjustment variable (pseudo-IWS) simulatively obtained is feed back to the mapping unit 24i1. It is expected that, in reality, because of problems such as a transmission path load and the accuracy of the integration circuit 24j3 and computing unit 24j4, the pseudo-IWS calculated in the preamplifier 24j deviates in correlation with the parameter set IAD setting from the IWS of an actual measured current waveform. The computing unit 24j4 supplies the mapping unit 24i1 with a correction value (update calibration factor), for a correspondence relation of each parameter set IAD setting corresponding to an IWS setting value, obtained from the difference from an IWS target (corresponding to an IWS actual measured value) inputted from the outside (controller 30) for calibration, and the mapping unit 24i1 performs correction. This correction can be defined as, e.g., a correction coefficient for a coefficient of an approximate expression of a parameter set IAD setting for the IWS, and this correction coefficient can also be held in the write register 24a. When performing calibration, the path to the output of the preamplifier 24j is cut off considering from the viewpoint of record waveform quality, and, in contrast, in a write operation, the path to the calibration circuit 24j5 is cut off as shown in FIG. 12. Further, a special sequence pattern may be used in calibration in order to stabilize correction-coefficient calculation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
a head; and
a controller that, with mapping information in which parameter sets each including multiple types of parameters related to operations of the head are mapped to an adjustment variable so as to be associated with multiple different values of the adjustment variable, evaluates operations of the head while changing the value of the adjustment variable contained in the mapping information and determines a parameter set corresponding to an appropriate value of the adjustment variable based on the evaluation results and the mapping information to set for operations of the head using the determined parameter set.

2. The disk device according to claim 1, further comprising
a disk medium that can be accessed by the head,
wherein in the mapping information, the parameter sets related to write operations of the head are mapped to the adjustment variable so as to be associated with multiple different values of the adjustment variable, and
wherein the controller reads, by the head, information written on the disk medium by the head to evaluate signal quality while changing the value of the adjustment variable and determines a parameter set corresponding to an appropriate value of the adjustment variable based on the evaluation results and the mapping information to set for write operations of the head using the determined parameter set.

3. The disk device according to claim 1, further comprising
a disk medium that can be accessed by the head,
wherein in the mapping information, the parameter sets related to read operations of the head are mapped to the adjustment variable so as to be associated with multiple different values of the adjustment variable, and
wherein the controller reads, by the head, information written on the disk medium by the head to evaluate signal quality while changing the value of the adjustment variable and determines a parameter set corresponding to an appropriate value of the adjustment variable based on the evaluation results and the mapping information to set for read operations of the head using the determined parameter set.

4. The disk device according to claim 2, wherein
in the mapping information, the parameter sets related to write current waveforms of the head are mapped to the adjustment variable related to integral values of write currents of the head so as to be associated with multiple different values of the adjustment variable.

5. The disk device according to claim 3, wherein
in the mapping information, the parameter sets related to read signal of the head are mapped to the adjustment variable related to usage bands of read signal of the head so as to be associated with multiple different values of the adjustment variable.

6. The disk device according to claim 4, wherein
the adjustment variable is a value obtained by integrating the value of a write current over a period from a zero-cross timing of the write current of the head until the timing when a predetermined time elapses.

7. The disk device according to claim 5, wherein
the adjustment variable is the upper limit of the usage band of a read signal of the head.

8. The disk device according to claim 1, wherein
the mapping information includes a table in which the parameter sets are mapped to the adjustment variable so as to be associated with multiple different values of the adjustment variable.

9. The disk device according to claim 1, wherein
the mapping information includes multiple functions denoting relations between multiple types of parameters included in the parameter set and the adjustment variable.

10. The disk device according to claim 1, wherein
the controller acquires multiple candidate parameter sets that are candidates to be associated with the adjustment variable and measures the value of the adjustment variable multiple times for each of the multiple candidate parameter sets and associates a candidate parameter set for which variation in the value of the adjustment variable is smallest from among the multiple candidate parameter sets, according to the measuring results, with the value of the adjustment variable so as to create the mapping information.

11. The disk device according to claim 10, wherein
the controller measures the value of the adjustment variable multiple times for each of the multiple candidate parameter sets and obtains a second adjustment variable indicating a standard deviation of the value of the adjustment variable measured multiple times for each of the multiple candidate parameter sets and associates a candidate parameter set for which the value of the second adjustment variable is smallest from among the multiple candidate parameter sets with the value of the adjustment variable so as to create the mapping information.

12. The disk device according to claim 1, further comprising
a preamplifier placed between the head and the controller, wherein the controller stores the determined parameter set in the preamplifier to set for operations of the head.

13. A preamplifier comprising:
a storage circuit that can store multiple values of an adjustment variable contained in mapping information out of the mapping information in which parameter sets each including multiple types of parameters related to operations of the head are mapped to the adjustment variable so as to be associated with multiple different values of the adjustment variable;
a determining circuit that evaluates operations of the head for the multiple values stored in the storage circuit and determines a parameter set corresponding to an appropriate value of the adjustment variable based on the evaluation results and the mapping information; and
a setting circuit that sets for operations of the head using the determined parameter set.

14. The preamplifier according to claim 13, wherein
in the mapping information, the parameter sets related to write operations of the head are mapped to the adjustment variable so as to be associated with multiple different values of the adjustment variable,
wherein the determining circuit reads, by the head, information written on the disk medium by the head to evaluate signal quality while changing the value of the adjustment variable and determines a parameter set corresponding to an appropriate value of the adjustment variable based on the evaluation results and the mapping information, and
wherein the setting circuit sets for write operations of the head using the determined parameter set.

15. The preamplifier according to claim 14, wherein
in the mapping information, the parameter sets related to write current waveforms of the head are mapped to the adjustment variable related to integral values of write currents of the head so as to be associated with multiple different values of the adjustment variable.

16. The preamplifier according to claim 15, wherein
the adjustment variable is a value obtained by integrating the value of a write current over a period from a zero-cross timing of the write current of the head until the timing when a predetermined time elapses.

17. The preamplifier according to claim 13, wherein
the mapping information includes a table in which the parameter sets are mapped to the adjustment variable so as to be associated with multiple different values of the adjustment variable.

18. The preamplifier according to claim 13, wherein
the mapping information includes multiple functions denoting relations between multiple types of parameters included in the parameter set and the adjustment variable.

19. The preamplifier according to claim 13, wherein
the determining circuit acquires multiple candidate parameter sets that are candidates to be associated with the adjustment variable and measures the value of the adjustment variable multiple times for each of the multiple candidate parameter sets and associates a candidate parameter set for which variation in the value of the adjustment variable is smallest from among the multiple candidate parameter sets, according to the measuring results, with the value of the adjustment variable so as to create the mapping information.

20. A control method of a disk device including a head, comprising:
with mapping information in which parameter sets each including multiple types of parameters related to operations of the head are mapped to an adjustment variable so as to be associated with multiple different values of the adjustment variable, evaluating operations of the head while changing the value of the adjustment variable contained in the mapping information;
determining a parameter set corresponding to an appropriate value of the adjustment variable based on the evaluation results and the mapping information; and
setting for operations of the head using the determined parameter set.

* * * * *